July 26, 1955   J. JOHNSON   2,713,769
SLIDING VANE ROTARY EXTERNAL COMBUSTION ENGINE
Original Filed July 21, 1949   3 Sheets-Sheet 1
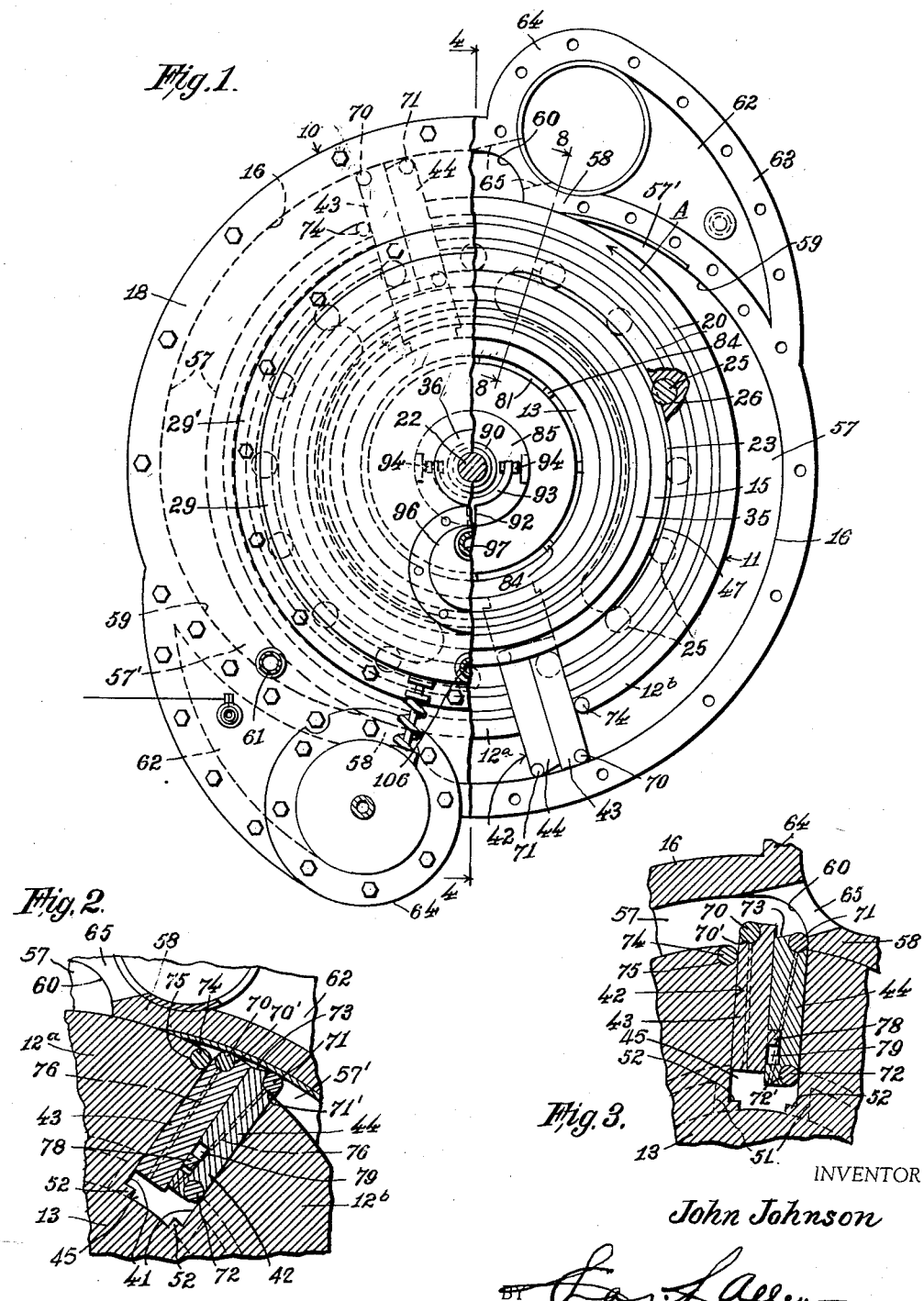
INVENTOR
John Johnson
ATTORNEY

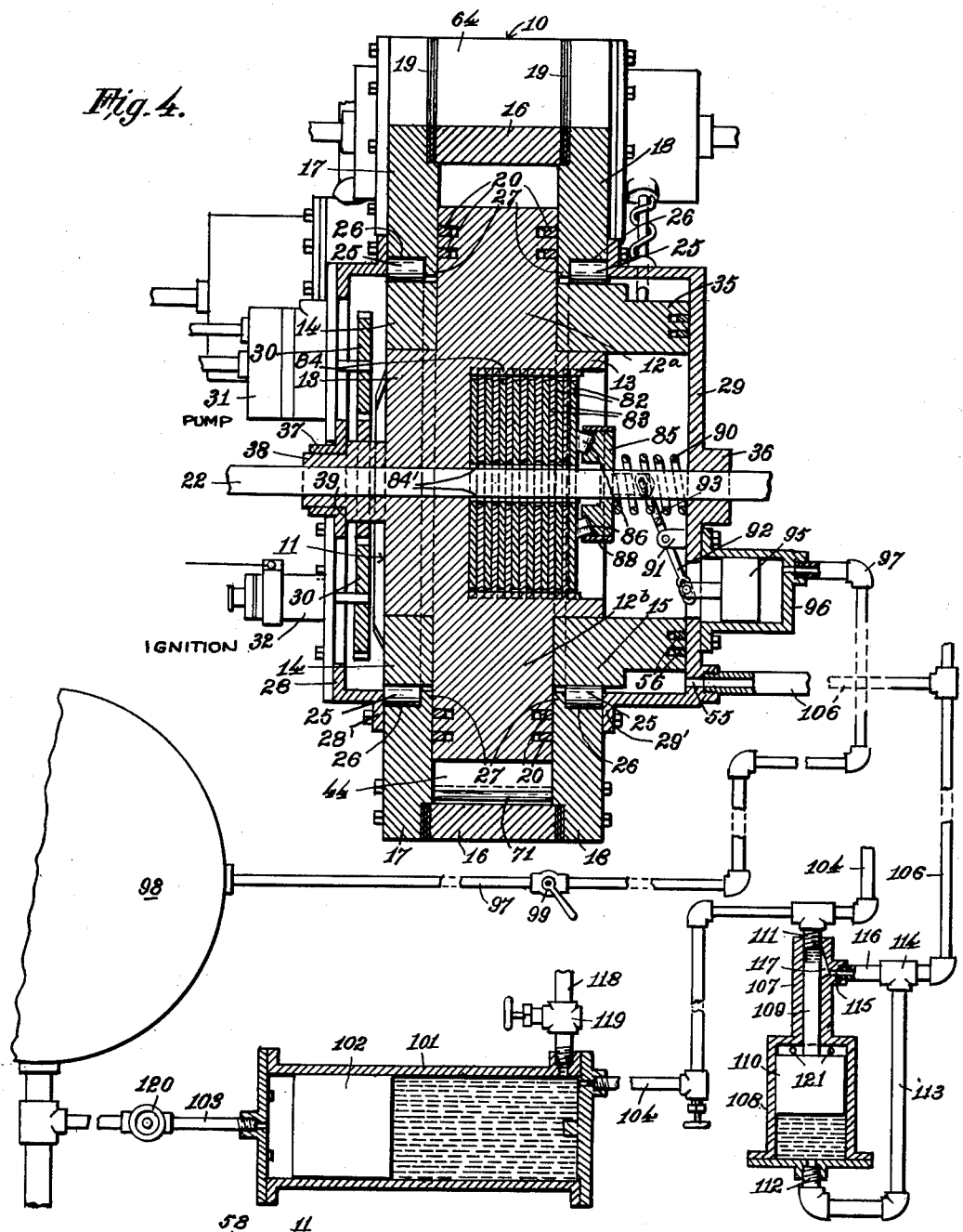

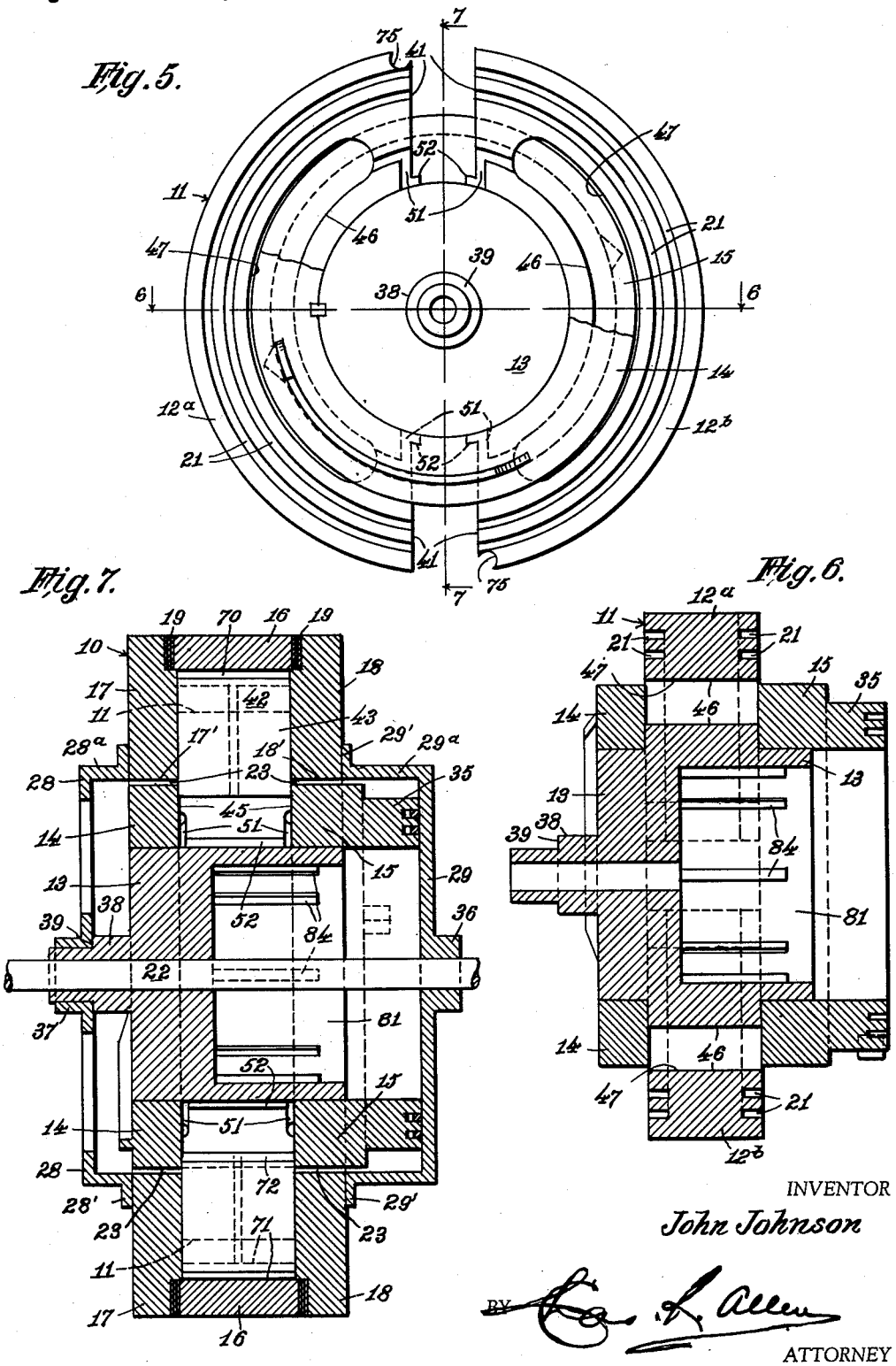

United States Patent Office 2,713,769
Patented July 26, 1955

2,713,769

SLIDING VANE ROTARY EXTERNAL COMBUSTION ENGINE

John Johnson, Spokane, Wash.

Original application July 21, 1949, Serial No. 106,028. Divided and this application July 23, 1951, Serial No. 238,074

5 Claims. (Cl. 60—39.08)

This invention relates to a sliding vane rotary combustion engine especially designed for use as the motive power for aircraft.

More specifically this application is a division of my co-pending application Ser. No. 106,028, filed July 21, 1949.

The object of the invention is to provide an improved motor construction whereby friction or resistance to the moving parts is reduced to a minimum.

Other objects will appear hereinafter.

The engine embodying the invention comprises generally a fixed casing constituting the stator and a rotor mounted therein, a pair of diametrically opposite arcuate expansion chambers formed in the periphery of the casing, abutments extending inwardly to the periphery of the rotor and separating the adjacent ends of the expansion chambers, radially movable vanes carried by said rotor with the outer ends thereof engaging the walls of said expansion chambers, and the peripheral walls of said expansion chambers being curved inwardly upon each side of the abutments to ease the vanes over the same and to prevent knocking. A pair of combustion chambers are provided in the casing adjacent corresponding ends of the expansion chambers and communicating therewith through valve controlled ports.

The invention consists generally in a casing comprising an outer peripheral wall and a pair of side walls, each of said side walls having a circular opening, a rotor including a body portion fitting between said side walls of the casing and laterally extending bearing rings fixed to said body portion and extending into said circular openings, and roller bearings seated in the peripheral walls of said openings and engaging said bearing rings. The body of the rotor comprises a pair of segments, the adjacent ends of which are parallel and spaced apart to form, in conjunction with the adjacent inner faces of the casing side walls and with the inner faces of said bearing rings, a pair of radial pockets for the sliding vanes.

The invention further comprises means whereby the vanes are continuously and yieldingly forced outwardly by fluid pressure.

The invention further includes an improved construction of the vanes whereby friction is minimized and hammering prevented.

The invention further consists in various details of construction and arrangement of parts as will be fully described hereinafter and particularly pointed out in the claims.

The invention will be more readily understood by reference to the accompanying drawings in which, Fig. 1 is an elevation of an engine embodying my invention, viewed from the exhaust side, and with the right half of the adjacent end plate of the housing removed to show the internal construction of the engine, Fig. 2 is a detail section upon an enlarged scale, illustrating a vane as it rides upon an abutment, Fig. 3 is a similar view illustrating the vane at the instant of passing from the crest of the abutment, Fig. 4 is a section taken on substantially the line 4—4 of Fig. 1, and including means for supplying fluid under pressure to the vanes, Fig. 5 is a side elevation of the rotor, a portion of one of the bearing rings being broken away, and the vanes being omitted, Fig. 6 is a transverse section on the line 6—6 of Fig. 5, Fig. 7 is a detail cross section of the engine similar to Fig. 4 but with the rotor in the position shown in Fig. 5, the section of the rotor being taken on the line 7—7 of Fig. 5, and the vanes illustrated in elevation, and Fig. 8 is a detail section on substantially the line 8—8 of Fig. 1.

Referring to the drawings, 10 indicates generally the fixed casing which constitutes the stator of the engine, and 11 the rotor which comprises a body portion consisting of two similar segments 12ᵃ and 12ᵇ, and a hub 13 of smaller diameter which is preferably integral with said segments. The hub 13 extends substantially equal distances beyond the sides of the body segments, and upon said hub are fixedly secured a pair of bearing rings 14 and 15 respectively, which are arranged close against the opposite sides of said body segments.

The casing comprises a substantially annular body portion 16 and end plates 17 and 18 upon the inlet and exhaust sides of the device respectively. These end plates 17 and 18 lie close against the adjacent portions of the segments 12ᵃ—12ᵇ of the rotor; and shims 19 between the body portion 16 and the end plates provide means for taking up wear between the rotor and the housing. Arcuate packing rings 20 are provided in grooves 21 in the lateral faces of the segments.

The engine shaft 22 extends axially through the casing and rotor, and is operatively connected to the latter by means hereinafter described.

The end plates 17 and 18 are provided with centrally disposed circular openings 17' and 18' (see Figs. 7 and 8) of larger diameter than the bearing rings 14 and 15 on the rotor, and into which said rings extend, the intervening spaces 23 between the rings and walls of said openings forming passageways for oil as will be more fully described hereinafter.

Interposed between the rings 14 and 15 and the adjacent edge walls of the openings 17' and 18' are a series of spaced antifriction rollers 25 which are seated in sockets 26 formed in the walls 17 and 18. The sockets 26 extend inwardly from the outer faces of the end plates and terminate short of the inner faces thereof, thereby providing end walls 27 at the inner end of the sockets forming abutments for the rollers 25.

End housings 28 and 29 secured to the plates 17 and 18 respectively, close the openings 17' and 18' (see Fig. 7) and, with the fuel pump and ignition device hereinafter mentioned, completely close the engine casing; and the base flanges 28' and 29' of said housings engage the outer ends of the rollers 25 and confine the same in their respective sockets.

The housing 28 is of sufficient depth to accommodate gearing 30 for driving a liquid fuel pump 31 and an ignition mechanism 32. As the pump and ignition device forms no part of the present invention as herein set forth, further description thereof is superfluous.

Housing 29 is of greater depth than housing 28 in order to accommodate a lateral annular extension 35 on the bearing ring 15, the purpose of which will appear hereinafter; and said housing is provided with a bearing 36 for the shaft 22.

A similar bearing 37 is provided on the housing 28 for a lateral extension 38 on the hub 13. The extension 38 is of relatively small diameter, and is shouldered as at 39, to bear against the housing 28.

As hereinbefore stated, the body of the rotor comprises two segments, 12ª and 12ᵇ. The adjacent ends of said segments terminate in parallel plane faces 41 (see Fig. 5) spaced apart to form slideways for radially reciprocable vanes 42, each vane consisting of a pair of plates 43 and 44. Said faces 41, together with the adjacent inner faces of the bearing rings 14 and 15, and each of the end plates 17 and 18, for radial chambers 45 in which the vanes reciprocate with a tight working fit.

In order to lighten the rotor, and particularly to provide oil space and passageways to aid in proper distribution of oil, each segment 12ª—12ᵇ is provided with an arcuate recess 46 which extends from adjacent one end of the segment to adjacent the opposite end, and from side to side thereof. The outer walls 47 of the recesses 46, are positioned radially beyond the peripheries of the rings 14 and 15 (Fig. 6), and preferably in transverse alignment with peripheral walls of the openings 17'—18' and with the inner faces of the peripheral walls 28ª and 29ª of the housings 28 and 29 respectively, as shown in Figs. 7 and 8. Oil grooves 51 in the lateral faces of the segments 12ª—12ᵇ extend from the ends of the recesses 46 to the base of the chambers 45. Abutments 52 are provided at the inner ends of the chambers 45 to prevent the vanes from engaging with the bottom wall thereof, and thereby cutting off the free flow of oil beneath the same.

Oil under pressure is supplied through an oil inlet 55 to the end housing 29 between the peripheral wall 29ª thereof and the ring extension 35. The outer end of the ring extension 35 engages the inner face of the outer wall of the housing 29, and packing rings 56 in the end of said extension prevent oil from entering the central cavity of the rotor. The oil passes from the housing 29 through the space between the bearing ring 15 and adjacent wall 29ª of housing 29 and the inner edge 18' of the end plate 18 into the recesses 46 of the rotor, thence through the spaces 23 between the bearing ring 14 and adjacent edge 17' of end plate 17 into housing 28 thereby providing lubrication for the roller bearings 25 and for the other parts of the engine. From the oil recesses 46 to oil passes through the grooves 51 to the base of the chambers 45 beneath the vanes 41 and forces the vanes outwardly.

The annular peripheral wall 16 of the stator or casing of the engine is spaced radially from the periphery of the rotor, forming a pair of expansion chambers 57 which are separated at the ends thereof by abutments 58 integral with said peripheral wall and arranged diametrically opposite from each other. The rotor turns in the direction of the arrow A, and the walls 16 at the approach end of the abutments 58 are gradually curved inwardly as at 59 to ease the vanes over the abutments, and to form gradually contracting exhaust portions 57' for the expansion chambers 57. On the opposite sides of the abutments the walls are abruptly curved outwardly as at 60 and merge into the wall portion 16. Suitable exhaust ports 61 are provided in the side wall adjacent the tapered ends of the expansion chambers.

Radially outward from the incurved exhaust portions 57' of the expansion chambers 57, are combustion chambers 62 formed between said incurved portion 59 and an outwardly arched wall portion 63, terminating in incurved portinos 64 which merge into the adjacent portions of wall 16. In the enlarged ends of each combustion chamber is arranged a valve for controlling the ports 65 between the combustion chambers and the expansion chambers. Said valves are fully described in the parent application hereinbefore identified, and as they form no part of the present application they are not illustrated or described herein.

As hereinbefore stated, each of the vanes 42 comprises a pair of preferably flat plates 43 and 44. The forward outer edge of the forward plate 43, and the rear outer edge of the follower plate 44, are provided with antifriction rollers 70 and 71 respectively which are mounted in corresponding sockets 70' and 71' in the vane sections; and the lower rear edge of the rear vane 44 is also provided with a similar roller 72 mounted in a socket 72'.

The rollers 70 and 71 extend slightly beyond the outer ends of the respective vane sections in order to ride on the outer wall of the chambers 57; and the outer end of vane member 71 is bevelled inwardly and forwardly, as at 73 to clear said wall as it rides upon the inwardly curved portion 59 thereof. See Fig. 2. The rollers 71 and 72 also extend slightly rearwardly from the vane section 44 to engage the adjacent wall 41 of the body segment. Rollers 74 are provided in sockets 75 at the end of the segments 12ª and 12ᵇ forward of the sections 43 to minimize the friction at these points. It should be noted that the several rollers above described extend the full width of the segments 12ª and 12ᵇ of the rotor, and that the ends of said rollers engage the end plates 17 and 18 with a close working fit in order to prevent gases in the expansion chambers from escaping past the same. Oil ducts 76 extend through the vane sections 43 and 44 from the lower ends thereof to the sockets 70' and 71' to provide means for lubricating the rollers 70 and 71.

Means are provided on the vane sections 43 and 44 to limit the radial movement of the sections relative to each other. As shown in Figs. 2 and 3, said means comprises a lug 78 on the rear face of the forward vane section 43 which engages in a longitudinally extending groove 79 in the adjacent face of the rear section 44. The groove is of ample length to permit initial retraction of the section 43 as the vane rides up onto the abutment 58, as shown in Fig. 2; but to limit the outward movement thereof after passing the abutment, as illustrated in Fig. 3. By this arrangement the vane as a whole is eased outwardly with the roller 71 riding on the curved portion 60 of the abutment 58, thereby avoiding hammering of the vanes on the engine casing, and also preventing a shearing action of the ends of the section 43 against said wall. It is obvious that the lug may be provided on the section 44 and the slot in the section 43, if preferred.

A clutch mechanism is provided for the engine, and this is arranged entirely within the engine to save space, which is essential in aircraft designing. To this end the hub 13 of the rotor is formed with a cylindrical recess 81 in which are arranged a plurality of clutch plates, alternate plates 82 and 83 of which are alternately splined to the hub and shaft respectively, the walls of the recess 81 being provided with splines 84 for this purpose, and 84' indicates the splines connecting the alternate plates to the shaft 22.

A presser ring 85 is freely mounted on the shaft 22, and is provided with conical antifriction rollers 86 bearing against the outermost clutch plate. The rollers are held in place in the ring 85 by end plates 88 secured to said ring.

A compression spring 90 is interposed between the presser ring 85 and a suitable abutment, such as the housing 29, and normally forces the ring inwardly to compress the plates into firm contact and thereby locks the rotor to the shaft.

Pivoted upon a bracket 91, on the inner face of the housing 29, is a lever 92 having a forked end 93 spanning the spring 90 and connected to lugs 94 on the pressure ring 85. The opposite end of lever 92 is connected to a piston 95 of an air cylinder 96 mounted on the housing 29. The outer end of the cylinder 96 is connected through a pipe 97 with a compressed air tank 98, and interposed in said pipe is a valve 99 which may be either manually or pedal operated as desired. When it is desired to release the clutch to disconnect the rotor from the shaft, the valve 99 is opened, and air admitted to cylinder 96 will force the piston 95 inwardly, thereby rocking the lever 92 and retracting the pressure ring 85. This releases the pressure on the clutch plates and uncouples the rotor from the shaft.

The full pressure of the air in the compressed air tank 98 is utilized for maintaining the fuel supply at a maximum pressure and for supplying oil at a full regulated pressure to parts of the engine not illustrated or described in the present application, but fully disclosed in the parent application hereinbefore identified.

The oil supplied to the rotor for lubricating the same and for projecting the vanes as hereinbefore described should be at a reduced pressure. To this end, an oil pressure tank 101 is provided, having a piston plunger 102, and one end of said tank is connected by a pipe 103 to the compressed air tank 98. The opposite end of the tank, which contains the oil, is connected by a pipe 104 leading to the engine; and a pressure reducer is interposed between the oil pipe 104 and a pipe 106 connected to the housing 29.

The pressure reducer comprises a pair of axially aligned cylinders 107 and 108, the former being of small diameter and the latter of large diameter, and said cylinders are provided with corresponding pistons 109 and 110 respectively which are rigidly connected. The outer end of the small cylinder is connected as at 111 to the high pressure pipe 104 whereby oil under full pressure is applied to the outer end of piston 109. The outer end of cylinder 108 is connected as at 112 to a pipe 113 extending to a T-connection 114. Remote from the outer end of cylinder 107 is a duct 115 connected by a nipple 116 to the T-connection 114. A tapered groove is formed in the wall of the cylinder 107 providing a by-pass 117 which increases in transverse dimensions from adjacent the outer end of said cylinder to the duct 115. The pipe 106, which leads to the housing 29 is coupled to the T-connection 114 thereby establishing communication from the duct 115 to the vane chambers 45. An oil supply pipe 118 is provided for the cylinder 101, and said pipe is equipped with a valve 119. A shut-off valve 120 is provided between the air tank 98 and the oil cylinder 101, to shut off the air pressure while oil is being supplied to the latter.

The oil under pressure in the end of cylinder 107 will force the pistons 109—110 downwardly, opening the by-pass 117 and building up pressure in the end of cylinder 108 and in the pipes 113 and 106 until the pressure therein rises sufficiently to force the vanes outwardly into operative engagement with the outer walls of the expansion chambers, as hereinbefore described. The built up pressure then forces the pistons 109—110 into position to reduce or close the by-pass 117. Vents 121 are provided in the cylinder 108 to prevent either back pressure or a partial vacuum at the end of piston 110 which would interfere with the sensitiveness of the device to variations in the oil pressures. In this manner a reduced but constant pressure is applied to the vanes.

It is believed that the construction and operation of the device will be fully understood from the above description.

I claim:

1. In a combustion engine of the type described, an engine casing including a circumferential portion and a pair of flat annular end plates each having a circular central opening of large diameter, a rotor comprising a hub and a body, said body consisting of a pair of substantially semi-cylindrical portions spaced intermediate the ends of said hubs, and integral therewith the adjacent end walls of said segmental portions being parallel and spaced apart, a pair of bearing rings fixed to said hub and fitting snugly against the adjacent faces of said segmental body portions, said rings extending into said circular openings of said end plates, antifriction bearings between said rings and the adjacent edges of said end plates, said rings and the parallel end walls of said body portions forming radially disposed chambers, slidable vanes having the inner ends thereof extending into said chambers, said side plates of the engine casing fitting snugly against the sides of said body portions and forming with the end walls of said body portions extensions of said vane chambers, end housings secured to said end plates and closing the apertures therein, means for supplying oil under pressure to one of said housings, said body portions each having an arcuate oil chamber extending from side to side thereof and with the outer wall thereof spaced radially beyond the periphery of said bearing rings, and oil ducts leading from said oil chambers to the inner ends of said vane chambers.

2. In a combustion engine of the class described, a rotor, a casing having a circumferential wall spaced radially outwardly from the periphery of said rotor, an abutment on said wall extending inwardly to said rotor, said wall on the approach side of said abutment being gradually curved inwardly, and on the opposite side of the abutment being abruptly curved outwardly, a radial vane mounted in said rotor and comprising a forward plate and a follower plate, antifriction rollers on the forward outer edge of the forward plate and upon the rear outer edge of the follower plate, and cooperating means on said plates to limit the radial movement of said plates relative to each other.

3. In a combustion engine of the type described, a rotor, a casing having a circumferential wall spaced radially outwardly from the periphery of said rotor, an abutment on said wall extending inwardly to said rotor, said wall on the approach side of said abutment being gradually curved inwardly, and on the opposite side of the abutment being abruptly curved outwardly, a radially slidable vane mounted in said rotor and comprising a forward plate and a follower plate, antifriction rollers on the forward outer edge of the forward plate and on the rear outer edge of the follower plate, and cooperating means on said plates permitting free retraction of the forward plate with relation to the follower plate as said plates ride up on the approach side of the abutment, but permitting but limited outward movement of said forward plate with relation to the follower plate as said vane passes said abutment.

4. In a combustion engine of the class described, a rotor, a casing comprising a circumferential wall spaced radially outwardly from the periphery of said rotor and a pair of end plates, an abutment on said wall extending inwardly to said rotor, said wall on the approach side of the abutment being gradually curved inwardly, and on the opposite side of the abutment being abruptly curved outwardly, a radial vane mounted in said rotor and comprising a forward plate and a follower plate, antifriction rollers on the forward outer edge of said forward plate and upon the rear outer edge of the follower plate, a longitudinal groove in one of said vane plates and a lug on the other of said vane plates extending into said groove permitting free retraction of the forward plate with relation to the follower plate as said plates ride up on the approach side of the abutment but permitting but limited outward movement of said forward plate with relation to the follower plate as the same passes said abutment.

5. In a combustion engine of the class described, a casing comprising a circumferential body portion having a combustion chamber and ignition means and a pair of flat annular end plates, each of said plates having a circular central opening of large diameter, a shaft, a rotor on said shaft comprising a hub and a body portion consisting of a pair of cylindrical segments, and a pair of bearing rings fixed upon said hub close against the opposite sides of said segments, said bearing rings extending into said central openings of said end plates, roller bearings interposed between said rings and the inner edges of said openings, end housings secured to said side plates respectively and closing said circular openings, said housings each comprising an annular wall having an inner face of the same diameter as said central openings in the respective end plates, timing gearing for said ignition means arranged in one of said housings, an annular lateral extension on the bearing ring opposite from said gearing and engaging the outer wall of the adjacent housing dividing said housing into a central oil free chamber, and a peripheral oil chamber, clutch mechanism in said oil free chamber for coupling said rotor and said shaft, and means for supplying oil under pressure to said peripheral oil chamber.

References Cited in the file of this patent

UNITED STATES PATENTS

| | | |
|---|---|---|
| 341,395 | Ainsworth | May 4, 1886 |
| 705,835 | Grove | July 29, 1902 |
| 753,086 | Mains | Feb. 23, 1904 |
| 1,339,483 | Simpson | May 11, 1920 |
| 1,644,490 | Post | Oct. 4, 1927 |
| 2,174,664 | Korany | Oct. 3, 1939 |
| 2,189,088 | Thompson | Feb. 6, 1940 |

FOREIGN PATENTS

| | | |
|---|---|---|
| 468,229 | France | Apr. 20, 1914 |
| 486,808 | France | Feb. 16, 1918 |
| 386,019 | Germany | Dec. 1, 1923 |
| 582,499 | Germany | Aug. 16, 1933 |